United States Patent
Wong et al.

(10) Patent No.: US 11,092,760 B2
(45) Date of Patent: Aug. 17, 2021

(54) ANTI-JAM ALIGNMENT SLEEVE HOLDER OR CONNECTOR HOUSING FOR A FERRULE ASSEMBLY

(71) Applicant: Senko Advanced Components Inc, Marlborough, MA (US)

(72) Inventors: Kim Man Wong, Kowloon (HK); Kazuyoshi Takano, Tokyo (JP)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 16/815,242

(22) Filed: Mar. 11, 2020

(65) Prior Publication Data

US 2020/0209491 A1     Jul. 2, 2020

Related U.S. Application Data

(63) Continuation of application No. 16/036,265, filed on Jul. 16, 2018, now Pat. No. 10,641,972.

(60) Provisional application No. 62/581,961, filed on Nov. 6, 2017, provisional application No. 62/546,920, filed on Aug. 17, 2017.

(51) Int. Cl.
　　*G02B 6/36*　　　(2006.01)
　　*G02B 6/38*　　　(2006.01)

(52) U.S. Cl.
　　CPC ......... *G02B 6/3874* (2013.01); *G02B 6/3821* (2013.01); *G02B 6/3871* (2013.01); *G02B 6/3878* (2013.01); *G02B 6/3885* (2013.01)

(58) Field of Classification Search
　　CPC .. G02B 6/3874; G02B 6/3885; G02B 6/3871; G02B 6/3821
　　See application file for complete search history.

(56) References Cited

U.S. PATENT DOCUMENTS

| | | |
|---|---|---|
| 4,150,790 A | 4/1979 | Potter |
| 4,312,564 A | 1/1982 | Cefarelli |
| 4,327,964 A | 5/1982 | Haesly |
| 4,478,473 A | 10/1984 | Frear |
| 4,762,388 A | 8/1988 | Tanaka |

(Continued)

FOREIGN PATENT DOCUMENTS

| | | |
|---|---|---|
| CA | 2495693 | 4/2004 |
| CN | 2836038 | 11/2006 |

(Continued)

OTHER PUBLICATIONS

European Search Report and Written Opinion dated Mar. 3, 2015 for EP 14187661.

(Continued)

*Primary Examiner* — Ellen E Kim
(74) *Attorney, Agent, or Firm* — Stinson LLP

(57) ABSTRACT

Embodiments disclosed herein are directed to a device and system of devices including: a connector housing comprising an alignment sleeve therein with a plural of angled surface and at least one opening, or an internal cavity of said connector housing has the same configuration as said alignment sleeve. Upon inserting ferrule assembly within an opening of said housing, a contact point on a collar or flange of said assembly moves along angled surfaces until it engages an opening between angled surfaces for securing ferrule assembly within connector housing without jamming.

13 Claims, 10 Drawing Sheets

(56) References Cited

U.S. PATENT DOCUMENTS

| | | |
|---|---|---|
| 4,764,129 A | 8/1988 | Jones |
| 4,840,451 A | 6/1989 | Sampson |
| 4,872,736 A | 10/1989 | Myers |
| 4,979,792 A | 12/1990 | Weber |
| 5,041,025 A | 8/1991 | Haitmanek |
| D323,143 S | 1/1992 | Ohkura et al. |
| 5,212,752 A | 5/1993 | Stephenson |
| 5,265,181 A | 11/1993 | Chang |
| 5,289,554 A | 2/1994 | Cubukciyan |
| 5,317,663 A | 5/1994 | Beard |
| 5,335,301 A | 8/1994 | Newman |
| 5,348,487 A | 9/1994 | Marazzi |
| 5,444,806 A | 8/1995 | de Marchi |
| 5,481,634 A | 1/1996 | Anderson |
| 5,506,922 A | 4/1996 | Grois |
| 5,521,997 A | 5/1996 | Rovenolt |
| 5,570,445 A | 10/1996 | Chou |
| 5,588,079 A | 12/1996 | Tanabe |
| 5,684,903 A | 11/1997 | Kyomasu |
| 5,687,268 A | 11/1997 | Stephenson |
| 5,692,090 A | 11/1997 | Szegda |
| 5,781,681 A | 7/1998 | Manning |
| 5,845,036 A | 12/1998 | De Marchi |
| 5,920,669 A | 7/1999 | Knecht |
| 5,937,130 A | 8/1999 | Amberg |
| 5,956,444 A | 9/1999 | Duda |
| 5,971,626 A | 10/1999 | Knodell |
| 6,041,155 A | 3/2000 | Anderson |
| 6,049,040 A | 4/2000 | Biles |
| 6,134,370 A | 10/2000 | Childers |
| 6,151,432 A | 11/2000 | Nakajima |
| 6,178,283 B1 | 1/2001 | Weigel |
| RE37,080 E | 3/2001 | Stephenson |
| 6,206,577 B1 | 3/2001 | Hall, III |
| 6,206,581 B1 | 3/2001 | Driscoll |
| 6,227,717 B1 | 5/2001 | Ott |
| 6,238,104 B1 | 5/2001 | Yamakawa |
| 6,247,849 B1 | 6/2001 | Liu |
| 6,276,840 B1 | 8/2001 | Weiss |
| 6,347,888 B1 | 2/2002 | Puetz |
| 6,364,537 B1 | 4/2002 | Maynard |
| 6,367,984 B1 | 4/2002 | Stephenson |
| 6,461,054 B1 | 10/2002 | Iwase |
| 6,471,412 B1 | 10/2002 | Belenkiy |
| 6,478,472 B1 | 11/2002 | Anderson |
| 6,551,117 B2 | 4/2003 | Poplawski |
| 6,579,014 B2 | 6/2003 | Melton |
| 6,634,801 B1 | 10/2003 | Waldron |
| 6,648,520 B2 | 11/2003 | McDonald |
| 6,668,113 B2 | 12/2003 | Togami |
| 6,682,228 B2 | 1/2004 | Rathnam |
| 6,685,362 B2 | 2/2004 | Burkholder |
| 6,695,486 B1 | 2/2004 | Falkenberg |
| 6,811,321 B1 | 11/2004 | Schmalzigaug |
| 6,854,894 B1 | 2/2005 | Yunker |
| 6,872,039 B2 | 3/2005 | Baus |
| 6,891,735 B2 | 5/2005 | Hultermans |
| 6,935,789 B2 | 8/2005 | Gross, III |
| 7,052,186 B1 | 5/2006 | Bates |
| 7,090,406 B2 | 8/2006 | Melton |
| 7,090,407 B2 | 8/2006 | Melton |
| 7,091,421 B2 | 8/2006 | Kukita |
| 7,111,990 B2 | 9/2006 | Melton |
| 7,113,679 B2 | 9/2006 | Melton |
| D533,504 S | 12/2006 | Lee |
| D534,124 S | 12/2006 | Taguchi |
| 7,150,567 B1 | 12/2006 | Luther |
| 7,153,041 B2 | 12/2006 | Mine |
| 7,198,409 B2 | 4/2007 | Smith |
| 7,207,724 B2 | 4/2007 | Gurreri |
| D543,146 S | 5/2007 | Chen et al. |
| 7,234,879 B2 | 6/2007 | Schrodinger |
| 7,258,493 B2 | 8/2007 | Milette |
| 7,281,859 B2 | 10/2007 | Mudd |
| 7,283,718 B2 | 10/2007 | Zaina |
| D558,675 S | 1/2008 | Chien et al. |
| 7,315,682 B1 | 1/2008 | En Lin |
| 7,325,976 B2 | 2/2008 | Gurreri |
| 7,325,980 B2 | 2/2008 | Pepe |
| 7,329,137 B2 | 2/2008 | Martin |
| 7,331,718 B2 | 2/2008 | Yazaki |
| 7,354,291 B2 | 4/2008 | Caveney |
| 7,371,082 B2 | 5/2008 | Zimmel |
| 7,387,447 B2 | 6/2008 | Mudd |
| 7,390,203 B2 | 6/2008 | Murano |
| D572,661 S | 7/2008 | En Lin et al. |
| 7,431,604 B2 | 10/2008 | Waters |
| 7,463,803 B2 | 12/2008 | Cody |
| 7,465,180 B2 | 12/2008 | Kusuda |
| 7,473,124 B1 | 1/2009 | Briant |
| 7,510,335 B1 | 3/2009 | Su |
| 7,513,695 B1 | 4/2009 | Lin |
| 7,561,775 B2 | 7/2009 | Lin |
| 7,591,595 B2 | 9/2009 | Lu |
| 7,594,766 B1 | 9/2009 | Sasser |
| 7,641,398 B2 | 1/2010 | O'Riorden |
| 7,695,199 B2 | 4/2010 | Teo |
| 7,699,533 B2 | 4/2010 | Milette |
| 7,824,113 B2 | 11/2010 | Wong |
| 7,837,395 B2 | 11/2010 | Lin |
| D641,708 S | 7/2011 | Yamauchi |
| 8,186,890 B2 | 5/2012 | Lu |
| 8,192,091 B2 | 6/2012 | Hsu |
| 8,202,009 B2 | 6/2012 | Lin |
| 8,251,733 B2 | 8/2012 | Wu |
| 8,267,595 B2 | 9/2012 | Lin |
| 8,270,796 B2 | 9/2012 | Nhep |
| 8,408,815 B2 | 4/2013 | Lin |
| 8,465,317 B2 | 6/2013 | Gniadek |
| 8,636,424 B2 | 1/2014 | Kuffel |
| 8,651,749 B2 | 2/2014 | Dainese Júnior |
| 8,770,863 B2 | 7/2014 | Cooke |
| 9,411,110 B2 | 8/2016 | Barnette, Jr. |
| 9,494,744 B2 | 11/2016 | de Jong |
| 9,494,745 B2 | 11/2016 | Iizumi |
| 9,548,557 B2 | 1/2017 | Liu |
| 9,551,842 B2 | 1/2017 | Theuerkorn |
| 9,568,686 B2 | 2/2017 | Fewkes |
| 9,581,768 B1 | 2/2017 | Baca |
| 9,658,407 B2 | 5/2017 | Völker |
| 9,684,313 B2 | 6/2017 | Chajec |
| 9,709,753 B1 | 7/2017 | Chang |
| 10,067,300 B2 | 9/2018 | Katagiyama |
| 2002/0172467 A1 | 11/2002 | Anderson |
| 2003/0053787 A1 | 3/2003 | Lee |
| 2003/0063862 A1 | 4/2003 | Fillion |
| 2003/0142919 A1 | 7/2003 | Zimmel |
| 2003/0157825 A1 | 8/2003 | Kane |
| 2004/0052473 A1 | 3/2004 | Seo |
| 2004/0062487 A1 | 4/2004 | Mickievicz |
| 2004/0136657 A1 | 7/2004 | Ngo |
| 2004/0141693 A1 | 7/2004 | Szilagyi |
| 2004/0161958 A1 | 8/2004 | Togami |
| 2004/0234209 A1 | 11/2004 | Cox |
| 2005/0111796 A1 | 5/2005 | Matasek |
| 2005/0141817 A1 | 6/2005 | Yazaki |
| 2006/0088247 A1 | 4/2006 | Tran |
| 2006/0089049 A1 | 4/2006 | Sedor |
| 2006/0127025 A1 | 6/2006 | Haberman |
| 2006/0140543 A1 | 6/2006 | Abendschein |
| 2006/0160429 A1 | 7/2006 | Dawiedczyk |
| 2006/0269194 A1 | 11/2006 | Luther |
| 2006/0274411 A1 | 12/2006 | Yamauchi |
| 2007/0028409 A1 | 2/2007 | Yamada |
| 2008/0008430 A1 | 1/2008 | Kewitsch |
| 2008/0044137 A1 | 2/2008 | Luther |
| 2008/0069501 A1 | 3/2008 | Mudd |
| 2008/0101757 A1 | 5/2008 | Lin |
| 2008/0226237 A1 | 9/2008 | O'Riorden |
| 2008/0267566 A1 | 10/2008 | En Lin |
| 2009/0022457 A1 | 1/2009 | de Jong |
| 2009/0028507 A1 | 1/2009 | Jones |
| 2009/0092360 A1 | 4/2009 | Lin |

(56) References Cited

U.S. PATENT DOCUMENTS

| | | |
|---|---|---|
| 2009/0148101 A1* | 6/2009 | Lu ................... G02B 6/3821 385/56 |
| 2009/0196555 A1 | 8/2009 | Lin |
| 2009/0214162 A1 | 8/2009 | O'Riorden |
| 2009/0220197 A1 | 9/2009 | Gniadek |
| 2009/0290938 A1 | 11/2009 | Asaoka |
| 2010/0034502 A1 | 2/2010 | Lu |
| 2010/0239220 A1 | 9/2010 | Lin |
| 2010/0247041 A1 | 9/2010 | Szilagyi |
| 2010/0322561 A1 | 12/2010 | Lin |
| 2011/0044588 A1 | 2/2011 | Larson |
| 2011/0058773 A1 | 3/2011 | Peterhans |
| 2011/0131801 A1 | 6/2011 | Nelson |
| 2011/0177710 A1 | 7/2011 | Tobey |
| 2011/0211792 A1 | 9/2011 | Koreeda |
| 2011/0267742 A1 | 11/2011 | Togami |
| 2012/0099822 A1 | 4/2012 | Kuffel |
| 2012/0155810 A1 | 6/2012 | Nakagawa |
| 2012/0189260 A1 | 7/2012 | Kowalczyk |
| 2012/0237177 A1 | 9/2012 | Minota |
| 2012/0269485 A1 | 10/2012 | Haley |
| 2012/0301080 A1 | 11/2012 | Gniadek |
| 2013/0071067 A1 | 3/2013 | Lin |
| 2013/0089995 A1 | 4/2013 | Gniadek |
| 2013/0094816 A1 | 4/2013 | Lin |
| 2013/0121653 A1 | 5/2013 | Shitama |
| 2013/0183012 A1 | 7/2013 | Cabanne Lopez |
| 2013/0259429 A1 | 10/2013 | Czosnowski |
| 2013/0322825 A1 | 12/2013 | Cooke |
| 2014/0016901 A1 | 1/2014 | Lambourn |
| 2014/0023322 A1 | 1/2014 | Gniadek |
| 2014/0050446 A1 | 2/2014 | Chang |
| 2014/0133808 A1 | 5/2014 | Hill |
| 2014/0219621 A1 | 8/2014 | Barnette, Jr. |
| 2014/0226946 A1 | 8/2014 | Cooke |
| 2014/0241678 A1 | 8/2014 | Bringuier |
| 2014/0241688 A1 | 8/2014 | Isenhour |
| 2014/0334780 A1 | 11/2014 | Nguyen |
| 2014/0348477 A1 | 11/2014 | Chang |
| 2015/0111417 A1 | 4/2015 | Vanderwoud |
| 2015/0247977 A1 | 9/2015 | Shimakawa |
| 2015/0301294 A1 | 10/2015 | Chang |
| 2015/0331201 A1 | 11/2015 | Takano |
| 2015/0355417 A1 | 12/2015 | Takano |
| 2015/0378113 A1 | 12/2015 | Good |
| 2016/0131849 A1 | 5/2016 | Takano |
| 2016/0172852 A1 | 6/2016 | Tamura |
| 2016/0195682 A1 | 7/2016 | Takano |
| 2016/0231512 A1 | 8/2016 | Seki |
| 2016/0259135 A1 | 9/2016 | Gniadek |
| 2016/0266326 A1 | 9/2016 | Gniadek |
| 2016/0291262 A1 | 10/2016 | Chang |
| 2016/0320572 A1 | 11/2016 | Gniadek |
| 2017/0003458 A1 | 1/2017 | Gniadek |

FOREIGN PATENT DOCUMENTS

| | | |
|---|---|---|
| CN | 201383588 | 1/2010 |
| CN | 202600189 | 12/2012 |
| DE | 202006011910 | 4/2007 |
| DE | 102006019335 | 10/2007 |
| EP | 1074868 | 2/2001 |
| EP | 1211537 | 6/2002 |
| EP | 1245980 | 10/2002 |
| EP | 1566674 | 8/2005 |
| GB | 2111240 | 6/1983 |
| JP | 2009229545 | 10/2009 |
| JP | 2009276493 | 11/2009 |
| TW | 200821653 | 5/2008 |
| WO | WO2001/79904 | 10/2001 |
| WO | WO2004/027485 | 4/2004 |
| WO | WO2008/112986 | 9/2008 |
| WO | WO2009/135787 | 11/2009 |
| WO | WO2010/024851 | 3/2010 |
| WO | WO2012/136702 | 10/2012 |
| WO | WO2012/162385 | 11/2012 |
| WO | WO2014/028527 | 2/2014 |
| WO | WO2014/182351 | 11/2014 |
| WO | WO2015/191024 | 12/2015 |
| WO | WO2016/148741 | 9/2016 |

OTHER PUBLICATIONS

European Search Report and Written Opinion dated Feb. 19, 2015 for EP 14168005.
"Fiber Optic Connectors and Assemblies Catalog" 2009, Huber & Suhner Fiver Optics, Herisau, Switzerland, www.hubersuhner.com.
"Fiber Optic Interconnect Solutions, Tactical Fiber Optical Connectors, Cables and Termini" 2006, Glenair, Inc., Glendale, California, www.mps-electronics.de.
"Fiber Optic Products Catalog" Nov. 2007, Tyco Electronics Corporation, Harrisburg, Pennsylvania, www.ampnetconnect.com.
International Search Report and Written Opinion dated Apr. 27, 2012 for PCT/US2011/058799.
International Search Report and Written Opinion dated Aug. 27, 2012 for PCT/US2012/039126.
International Search Report and Written Opinion dated Jan. 16, 2014 for PCT/US2013/54784.
International Search Report and Written Opinion dated Oct. 9, 2014 for PCT/US2014/041500.
International Search Report and Written Opinion dated May 14, 2014 for PCT/US2014/012137.
International Search Report and Written Opinion dated Aug. 21, 2008 for PCT/US2008/057023.
International Preliminary Report on Patentability dated Aug. 22, 2016 from related International Application No. PCT/US2015/059458, International Filing dated Nov. 6, 2015.
International Search Report (ISR) WO2008112986 dated Sep. 15, 2009.
ISR WO2014028527ISR dated Feb. 20, 2014.
ISR WO2015U557610ISR dated Jan. 21, 2016.
ISR WO2016176083ISR dated May 19, 2016.

* cited by examiner

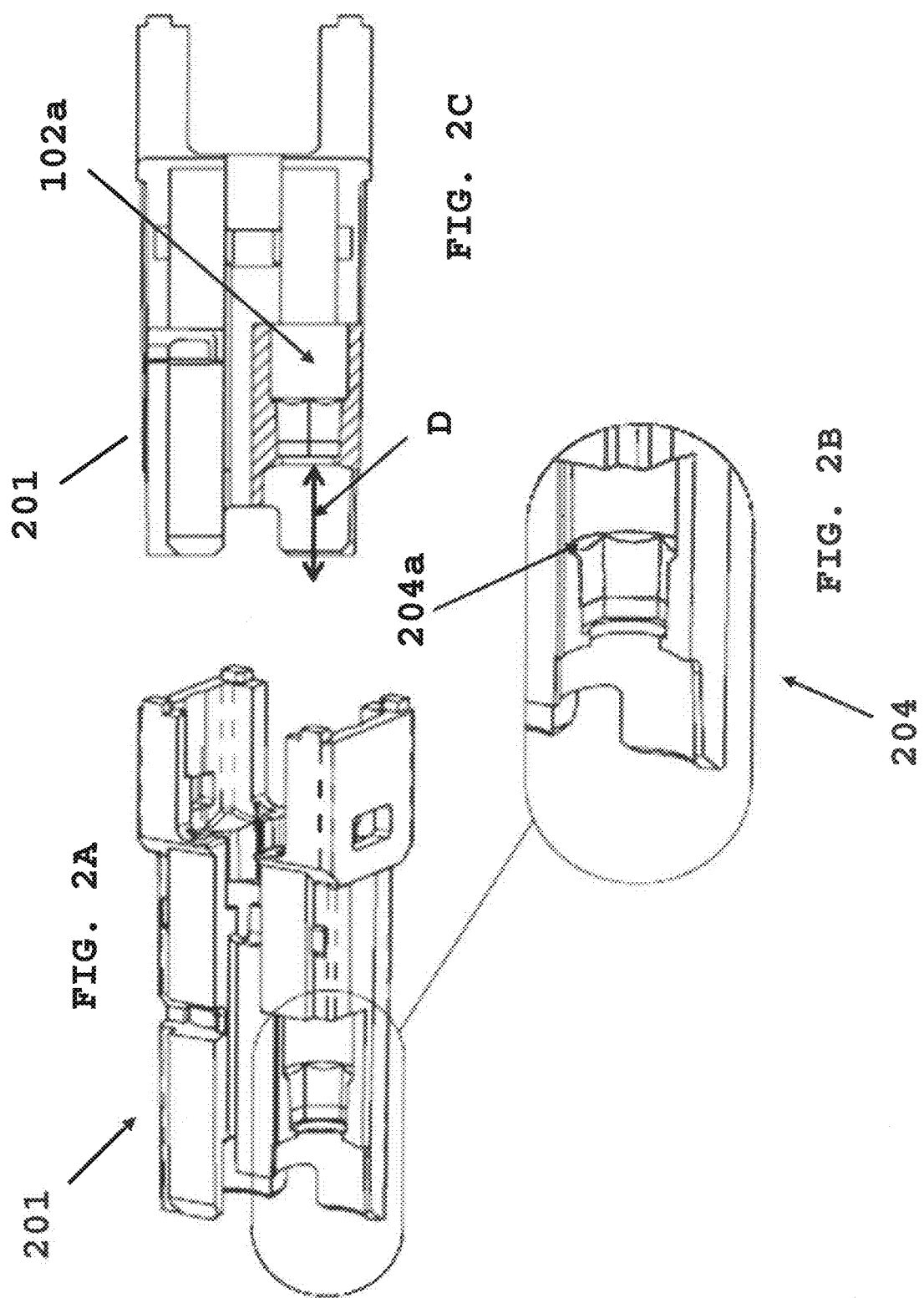

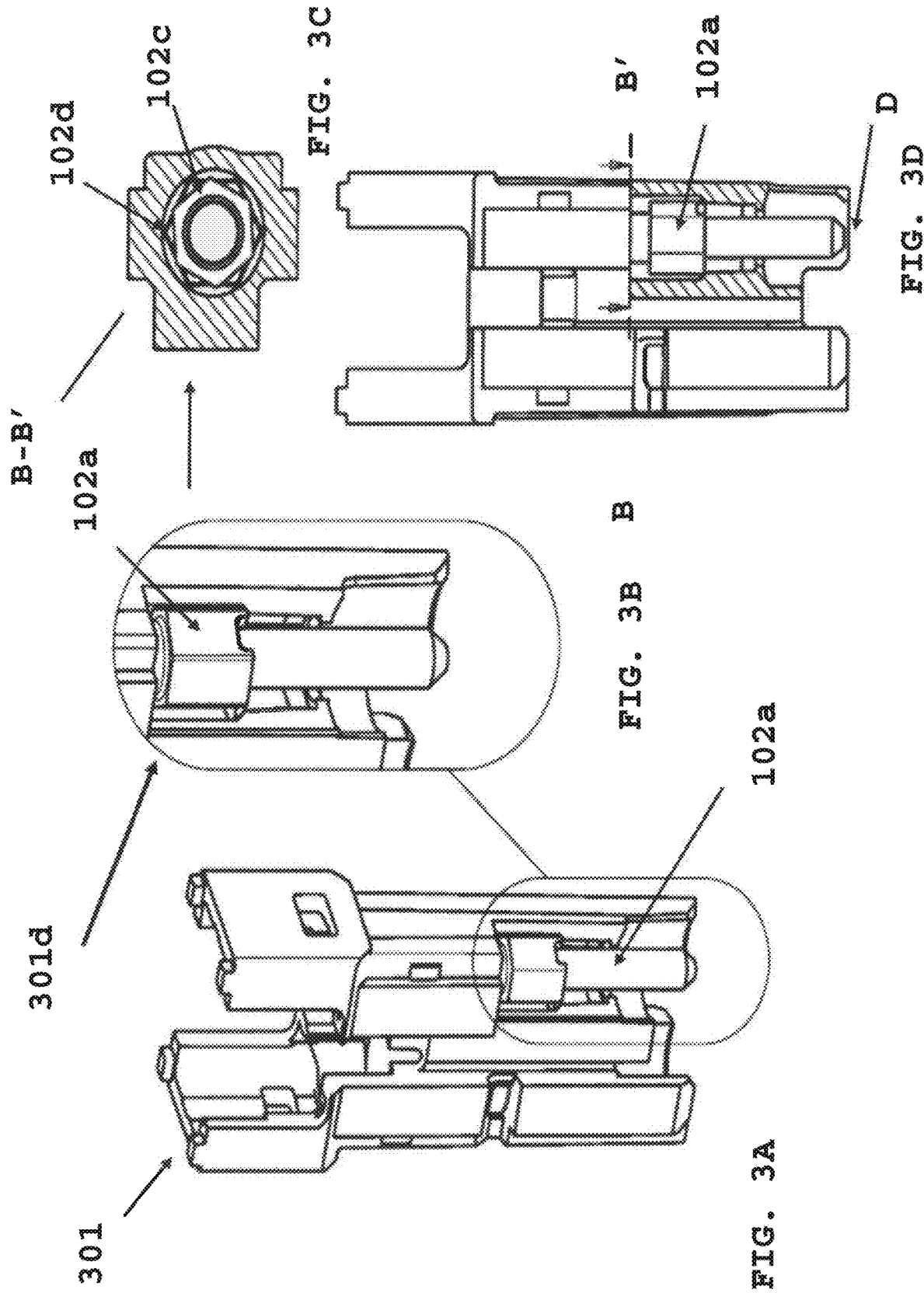

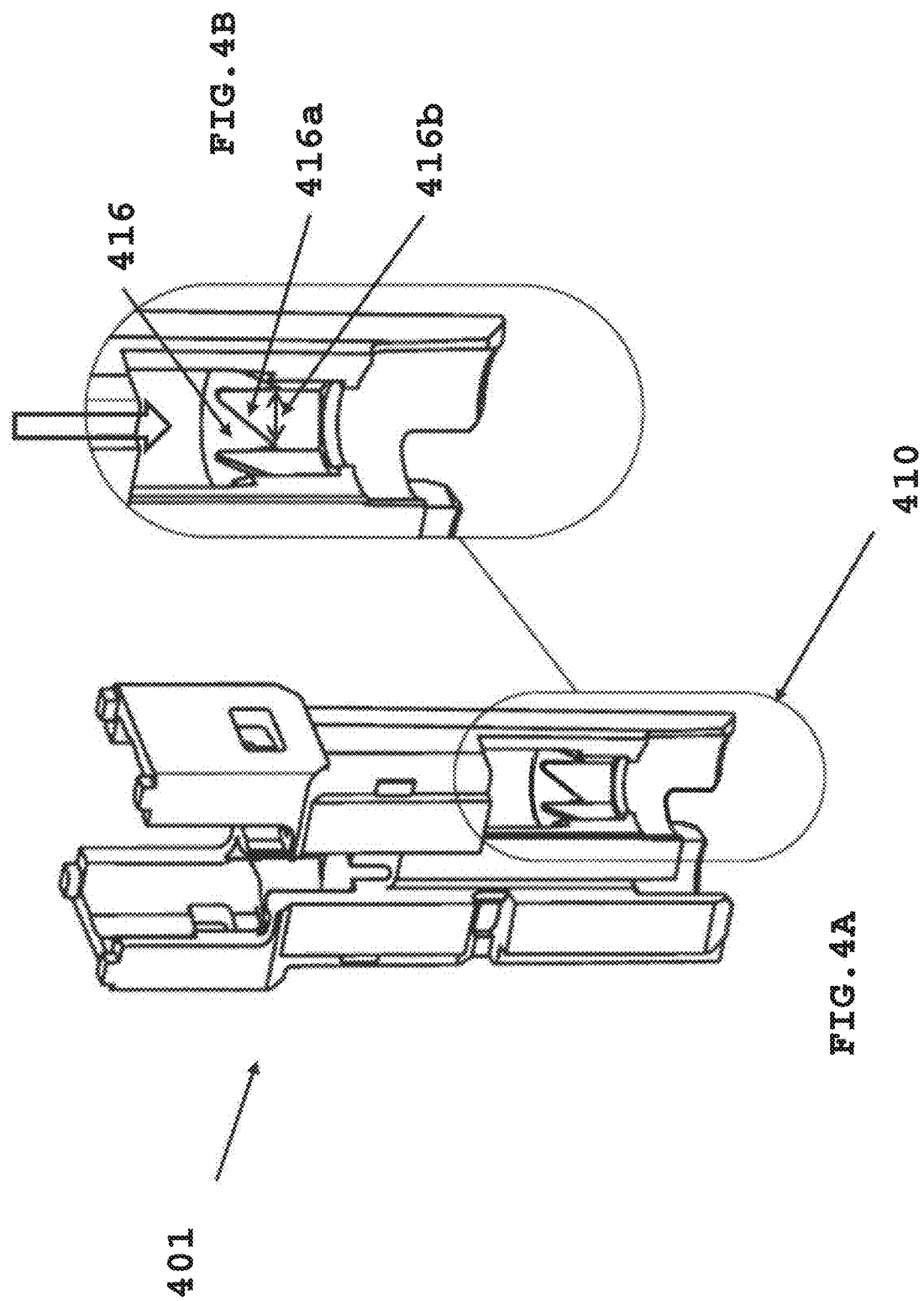

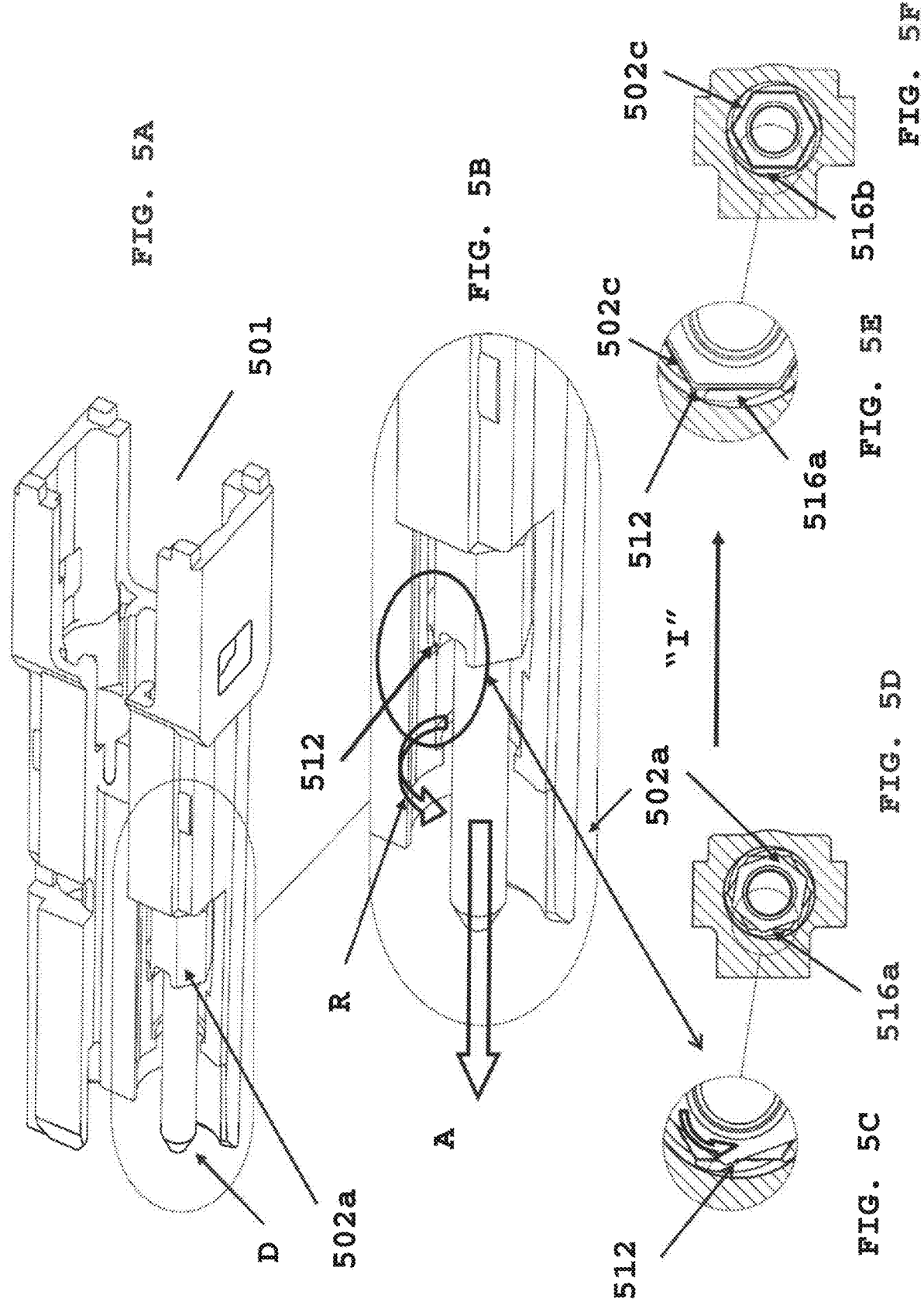

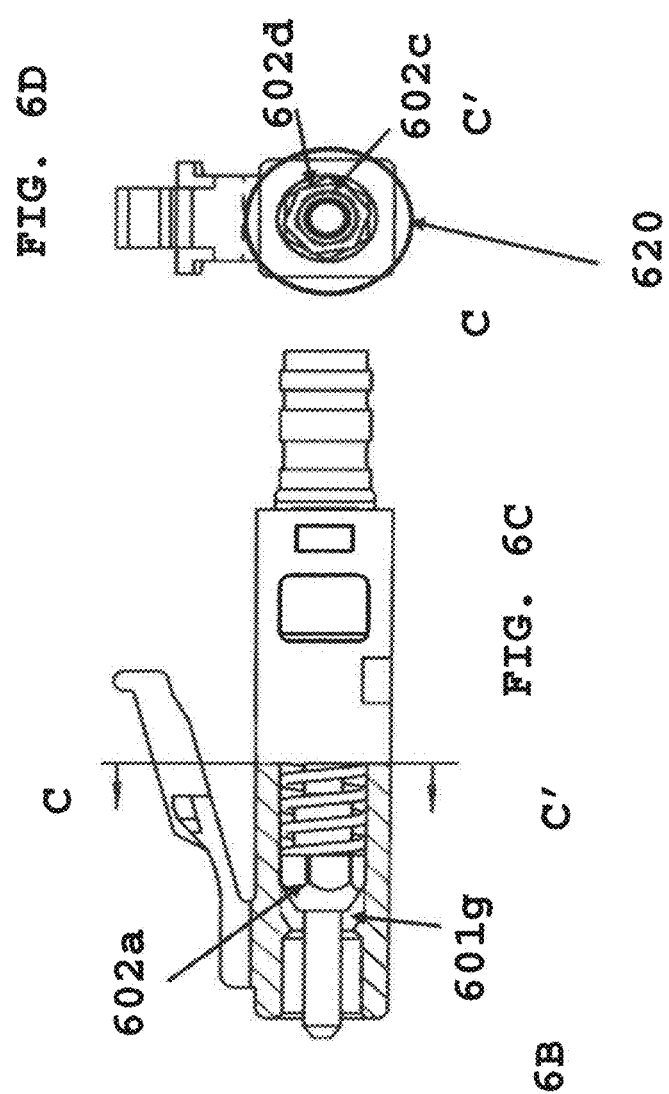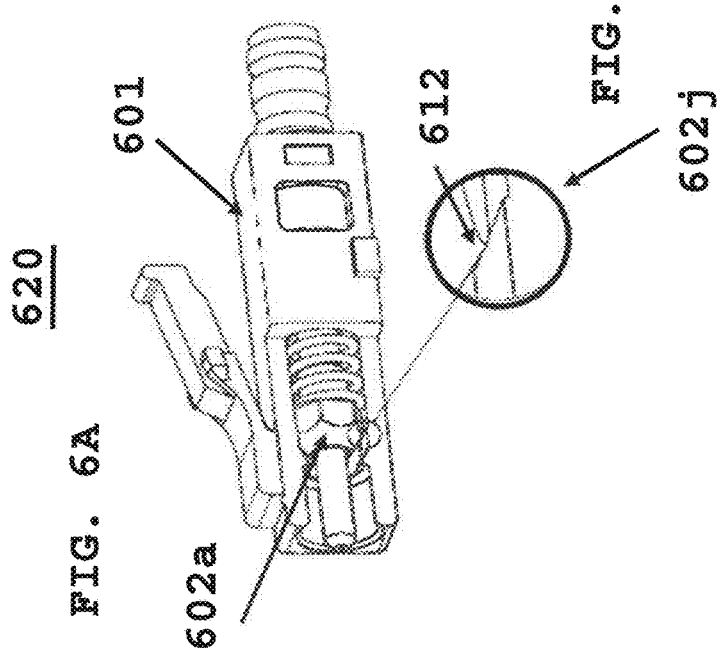

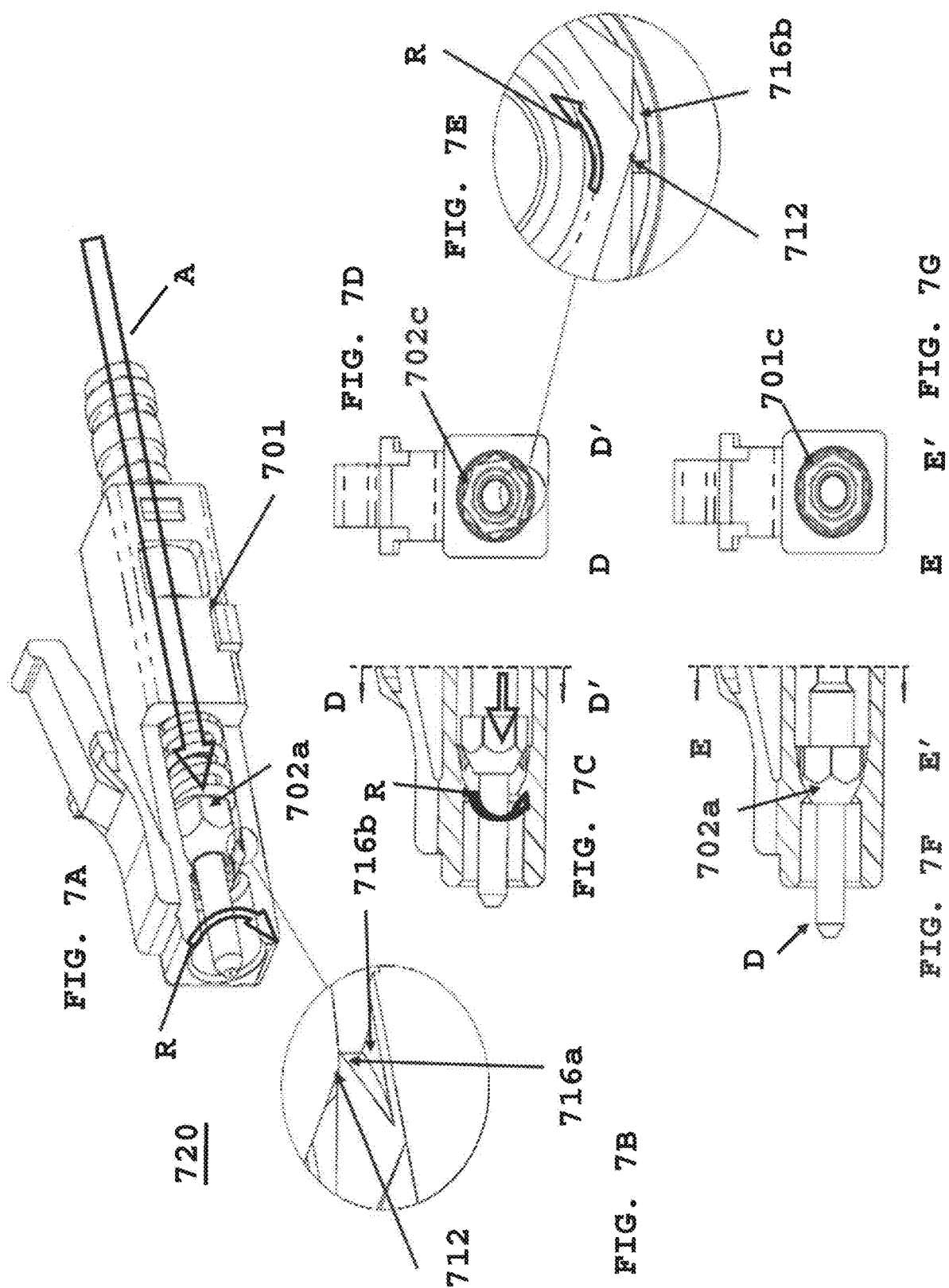

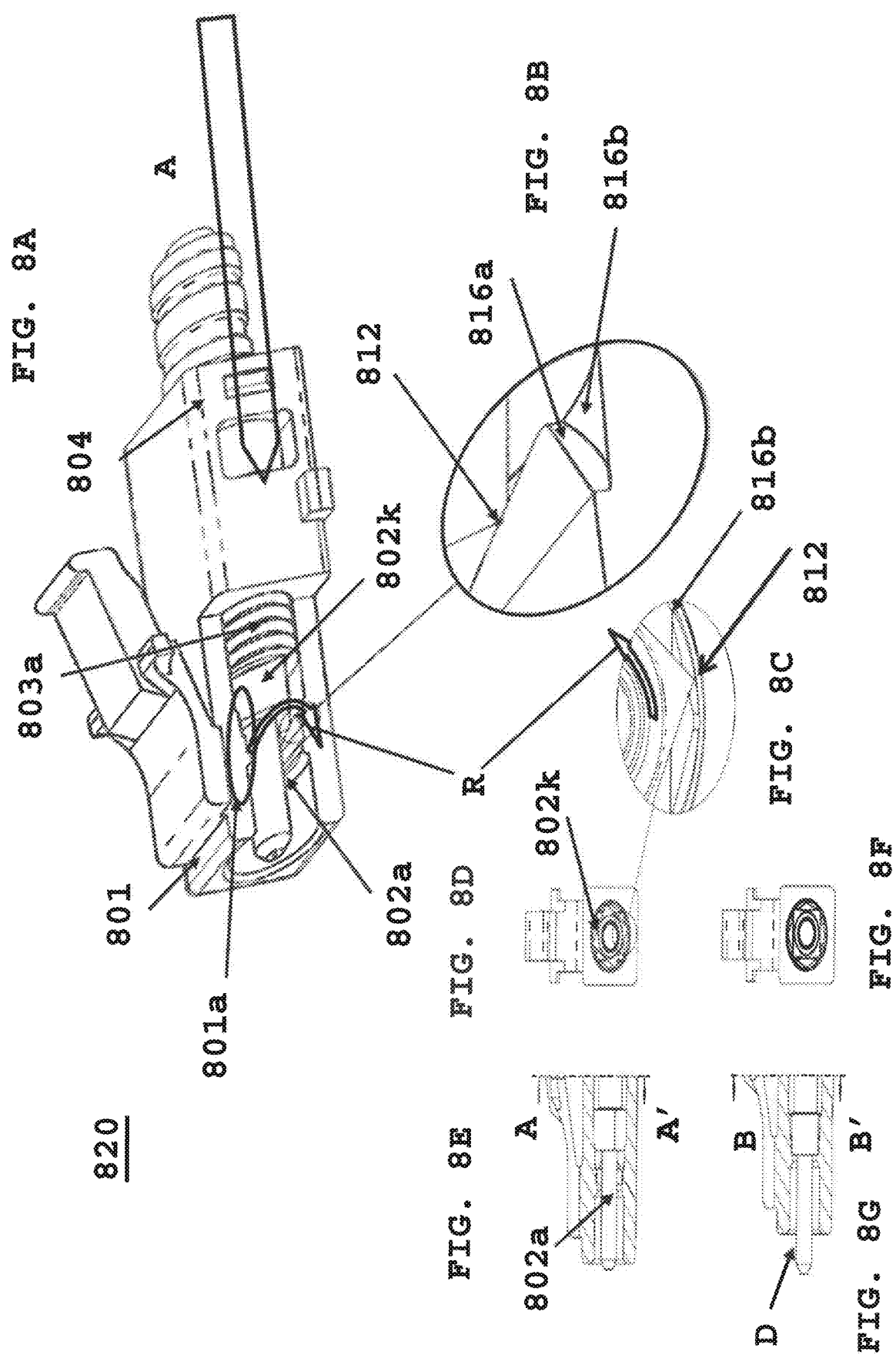

ANTI-JAM ALIGNMENT SLEEVE HOLDER OR CONNECTOR HOUSING FOR A FERRULE ASSEMBLY

PRIORITY CLAIM TO RELATED-APPLICATIONS

This application claims the benefit of U.S. patent application Ser. No. 16/036,265 filed Jul. 16, 2018 title "Anti-Jam Alignment Sleeve Holder or Connector Housing for a Ferrule Assembly", which claims priority to U.S. Provisional Application No. 62/546,920 filed Aug. 17, 2017, entitled "Narrow Width Adapters and Connectors with Modular Latching Arm," and U.S. Provisional No. 62/581,961 filed Nov. 6, 2017, entitled "Narrow Width Adapters and Connectors with Modular Latching Arm," each of which is incorporated herein by reference in its entirety.

BACKGROUND

The present disclosure relates generally to fiber optic connectors having at least one ferrule assembly inserted in a housing. The connectors can use the invention, among others, is a Lucent Connector (LC) connector or CS® connector sold by assignee of the present invention.

The prevalence of the Internet has led to unprecedented growth in communication networks. Consumer demand for service and increased competition has caused network providers to continuously find ways to improve quality of service while reducing cost.

Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead. However, the deployment of high-density interconnect panels has not been fully realized.

In communication networks, such as data centers and switching networks, numerous interconnections between mating connectors may be compacted into high-density panels. Panel and connector producers may optimize for such high densities by shrinking the connector size and/or the spacing between adjacent connectors on the panel. While both approaches may be effective to increase the panel connector density, shrinking the connector size and/or spacing may also increase the support cost and diminish the quality of service.

While an operator may attempt to use a tool, such as a screwdriver, to reach into a dense group of connectors and activate a release mechanism, adjacent cables and connectors may obstruct the operator's line of sight, making it difficult to guide the tool to the release mechanism without pushing aside the adjacent cables. Moreover, even when the operator has a clear line of sight, guiding the tool to the release mechanism may be a time-consuming process. Thus, using a tool may not be effective at reducing support time and increasing the quality of service.

Small Form Factor Pluggable Transceivers (SFP) are used presently in telecommunication infrastructures within rack mounted copper-to-fiber media converters, and are also known as Ethernet switches and/or patching hubs. These infrastructure Ethernet and fiber optic connections are evolving quickly to increase connection density due to limited space for such equipment. Although fiber optic connectors have become smaller over the years, they have not been designed to be any smaller than necessary to plug into commonly sized and readily available SFPs. However, as transceiver technologies develop, smaller SFPs will be used to create higher density switches and/or patching hub equipment. Accordingly, there is a need for fiber optic connectors that will meet the needs of future developments in smaller SFPs.

SUMMARY

In summary, one aspect provides a connector comprising: a front body comprising: a top and a bottom, a groove running lengthwise on the top of the front body, a recess running widthwise on a surface of the front body, and a rear body detachably connected to the front body forming a housing, wherein a portion of the rear body fits inside the front body when detachably connected; and at least one ferrule assembly inserted into the front body opening configured to receive the ferrule assembly. The ferrule assembly upon insertion may jam when its collar becomes misaligned and stuck in an opening within a front body opening. A cavity in front body opening is configured to match an outer surface of ferrule assembly collar in a CS, LC, SC, or MPO connector. The front body cavity accepting ferrule assembly is sometimes called an alignment sleeve, or has an alignment sleeve inserted into said cavity near a proximal or second end of a connector.

In the present invention, a first end of the alignment sleeve is configured with a plural of lead-ins configured to make contact with ferrule assembly collar outer surface, as ferrule assembly is inserted into its corresponding alignment sleeve. A near edge of one or more lead-ins cause ferrule assembly to rotate under biasing force of its corresponding spring or similar component like a piece of plastic, positioning the collar within cavity while preventing ferrule assembly from becoming jammed between outer collar surface and inner alignment sleeve surface within cavity, thus accepting and aligning ferrule assembly within connector housing. The angle and depth of a lead-in depends on the number of collar sides on outer surface thereof. A hex-sided collar outer surface requires a greater distance between lead-in edges than an eight sided collar outer surface. A more acute angle collar surface requires less lead-ins. Other variations can be used.

For a CS connector 100, ferrule assembly (102a, 102b) may become misaligned or stuck in alignment sleeve holder 204 of FIG. 2B. This would over compress bias spring (103a, 103b) leading to component failure. More importantly, ferrule with fiber strand would not be forward enough inside connector front body 101 to meet a required distance between fiber strand and opposing fiber strand (e.g. another connector fiber strand or transceiver electronics). Failure to meet required separation distance between two opposing fiber strands increases signal loss. Connector 100, FIG. 1, is assembled in direction of arrow "A", Connector housing 101 accepts one or more ferrule assembly (102a, 102b) (for example a MPO connector has a single ferrule assembly at FIG. 1C). At a distal end of each ferrule assembly is positioned a bias spring (103a, 103b), and placed over springs and ferrule assembly is back body 104 that compresses springs that push forward ferrule assembly into outer housing, and back body 104 is secured when latch (106a, 106b) snaps into corresponding opening (107a, 107b). As known in the prior art, ferrule assembly has a fiber strand encased by a ceramic body. It is this fiber strand that carries the signal. If the ferrules are not forward enough then signal loss occurs by becoming jammed within alignment sleeve (204). The present invention overcomes this failure typically called insertion loss.

In the present invention, ferrule collar (102c, 102e) meets a plural of lead-ins (416), (refer to FIG. 4), at a first end of a corresponding alignment sleeve 204. Lead-ins 416 cause ferrule assembly (102a, 102b) to rotate under the force of springs (103a, 103b) until the outer surface of the ferrule assembly (102c, 102e) or ferrule collar engages or comes to rest within opening (416a) between the lead-ins (refer to FIG. 4B). At this point ferrule assembly is aligned with its corresponding alignment sleeve, and the fiber strand is at a distance from an opposing receiver according to industry specification for minimizing insertion or signal loss.

BRIEF DESCRIPTION OF THE DRAWINGS

FIG. 2A is a perspective view of a CS connector front body with a cut-away view illustration alignment sleeve;

FIG. 2B is a zoomed view of FIG. 2A cut-away;

FIG. 2C is a cross-section view of an alignment sleeve or channel of front body of FIG. 2A;

FIG. 3A is a cut-away view of alignment sleeve with a ferrule assembly improperly inserted therein;

FIG. 3B is a zoomed view of FIG. 3A;

FIG. 3C depicts a view along cut B-B' of FIG. 3A;

FIG. 3D is a view along cut B-B' showing misalignment of ferrule collar within alignment sleeve;

FIG. 4A is a perspective view with a cut-away showing the present invention configured within alignment sleeve of a CS connector;

FIG. 4B is a zoomed view of cut-away of FIG. 4A;

FIG. 5A is a perspective view with a cut-away showing present invention configured as ferrule assembly is being inserted into alignment sleeve of a CS connector;

FIG. 5B is a zoomed view of FIG. 5A cut-away;

FIG. 5C is a zoomed view of collar outer surface in contact with lead-in of the present invention;

FIG. 5D is a front perspective view of ferrule collar outer surface engaging lead-in as ferrule assembly is inserted into a first end of alignment sleeve;

FIG. 5E is a zoomed view of FIG. 5B as ferrule assembly is further inserted into alignment sleeve; ferrule assembly rotates in direction of "R" of FIG. 5B as bias spring forces ferrule assembly in direction "R";

FIG. 5F is a front perspective view of ferrule collar just prior to collar surface contact point engaging lead-in within alignment sleeve at a first end;

FIG. 6A is a perspective view of prior art LC connector with ferrule assembly improperly inserted into alignment sleeve holder;

FIG. 6B is a zoomed view of contact point of collar outer surface misaligned within a plug frame;

FIG. 6C is a cut-away view of a ferrule assembly within a plug frame of LC connector up to line C-C';

FIG. 6D is a front view along C-C' showing ferrule assembly misaligned within plug frame of LC connector;

FIG. 7A is a perspective view of LC connector initially misaligned ferrule assembly;

FIG. 7B is a zoomed view of ferrule assembly initially misaligned of FIG. 7A;

FIG. 7C is a cross-section view of ferrule assembly as it rotates in direction "R" under the force of bias member for proper alignment according to the present invention;

FIG. 7D is a front view of ferrule assembly approaching alignment or proper orientation within alignment sleeve of connector plug frame along line D-D' of FIG. 7C;

FIG. 7E is a zoomed view of FIG. 7D as contact point rotates into proper alignment according to the present invention;

FIG. 7F is a side cut away view of a properly inserted and aligned ferrule assembly;

FIG. 7G is a zoomed view of a properly inserted aligned ferrule assembly along line E-E' of FIG. 7F;

FIG. 8A is a perspective view of square flange plug frame, or SC connector, with ferrule assembly being inserted in direction "A", and rotating in direction "R", as ferrule is inserted;

FIG. 8B is a zoomed view of ferrule collar contact point, during rotation, and prior to orienting via lead-in according to the present invention;

FIG. 8C is a zoomed view of rotation, "R", prior to ferrule collar contact point just prior to orienting via lead-in;

FIG. 8D is a front view of FIG. 8C of initially misaligned ferrule assembly within channel or cavity of SC connector or plug frame, which acts as an outer housing along line A-A' of FIG. 8E;

FIG. 8E is a side view cut-away of ferrule assembly initially misaligned in channel or alignment sleeve of SC connector;

FIG. 8F is a front view of aligned ferrule assembly after proper rotation, "R", along line B-B' of FIG. 8G;

FIG. 8G is a side view cut-away of after complete rotation, "R", where ferrule assembly is aligned within SC plug frame.

DETAILED DESCRIPTION

Figure 1A:
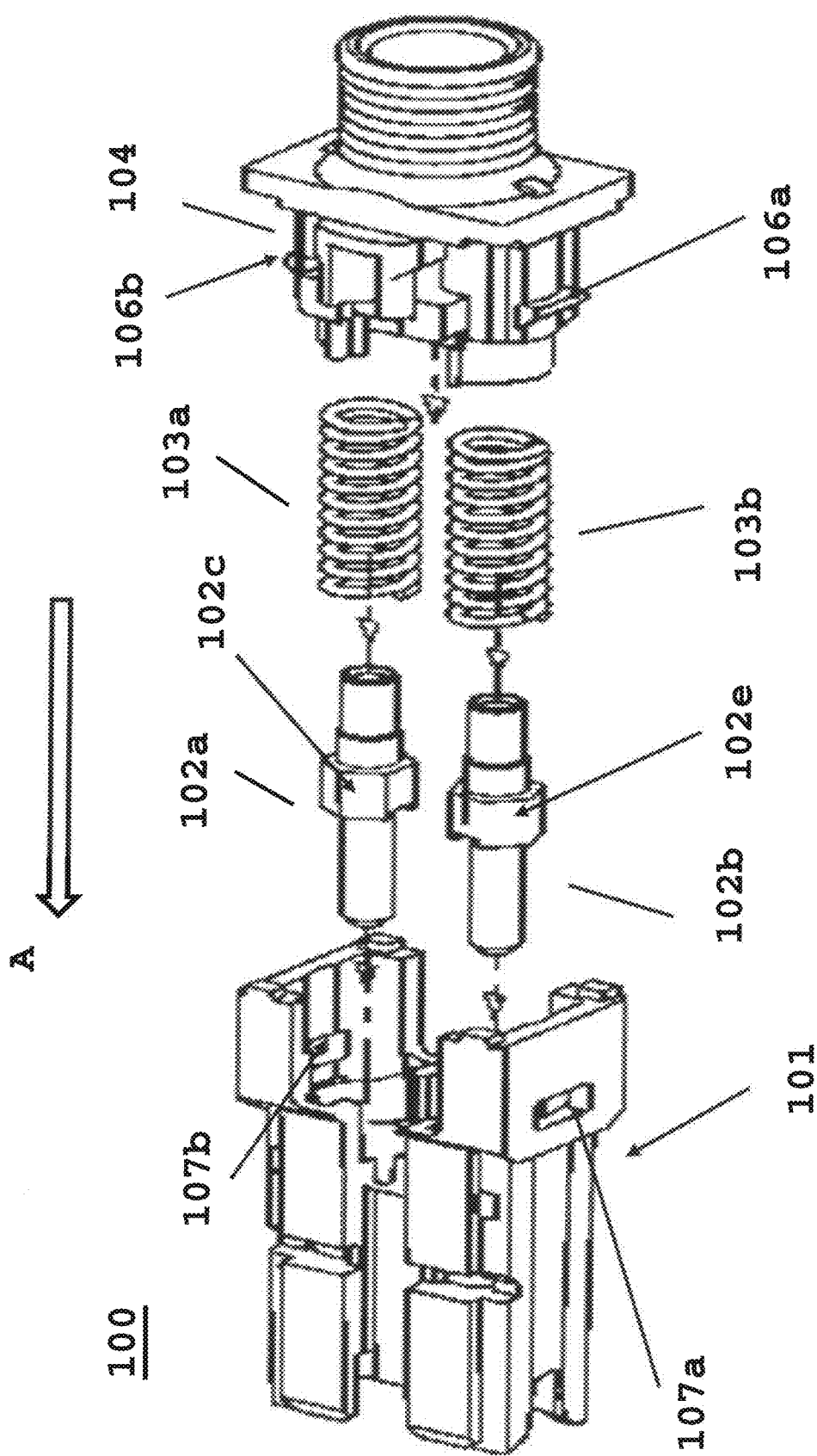
FIG. 1A is an exploded view of a CS® connector prior to insertion of a plural of ferrule assembly within a front body.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, hut not limited to."

The following terms shall have, for the purposes of this application, the respective meanings set forth below.

A connector, as used herein, refers to a device and/or component thereof that connects a first module or cable to a second module or cable. The connector may be configured for fiber optic transmission or electrical signal transmission. The connector may be any suitable type now known or later developed, such as, for example, a ferrule connector (FC), a fiber distributed data interface (FDDI) connector, an LC connector, a mechanical transfer (MT) connector, a square connector (SC) connector, an SC duplex connector, or a straight tip (ST) connector. The connector may generally be defined by a connector housing body. In some embodiments, the housing body may incorporate any or all of the components described herein.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable.

Various embodiments described herein generally provide a remote release mechanism such that a user can remove cable assembly connectors that are closely spaced together on a high-density panel without damaging surrounding connectors, accidentally disconnecting surrounding connectors, disrupting transmissions through surrounding connectors, and/or the like. Various embodiments also provide narrow pitch LC duplex connectors and narrow width multi-fiber connectors, for use; for example, with future narrow pitch LC SFPs and future narrow width SFPs. The remote release mechanisms allow use of the narrow pitch LC duplex connectors and narrow width multi-fiber connectors in dense arrays of narrow pitch LC SFPs and narrow width multi-fiber SFPs.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and, C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations, or improvements therein may be subsequently made by those skilled in the art, each of which is also intended to be encompassed by the disclosed embodiments.

FIG. 1A depicts a CS® connector, as disclosed in related provisional applications referenced here. Front body 101 accepts at least one ferrule assembly (102a, 102b), a corresponding ferrule bias spring (103a, 103b) and a back body 104. The back body 104 has a pair of opposing latches (106a, 106b) that snap into corresponding opening (107a, 107b), which compresses bias springs that pushes its corresponding ferrule assembly forward. As discussed above, in a prior art connector the ferrule assembly could become jammed if misaligned upon insertion of said assembly.

Figure 1B:
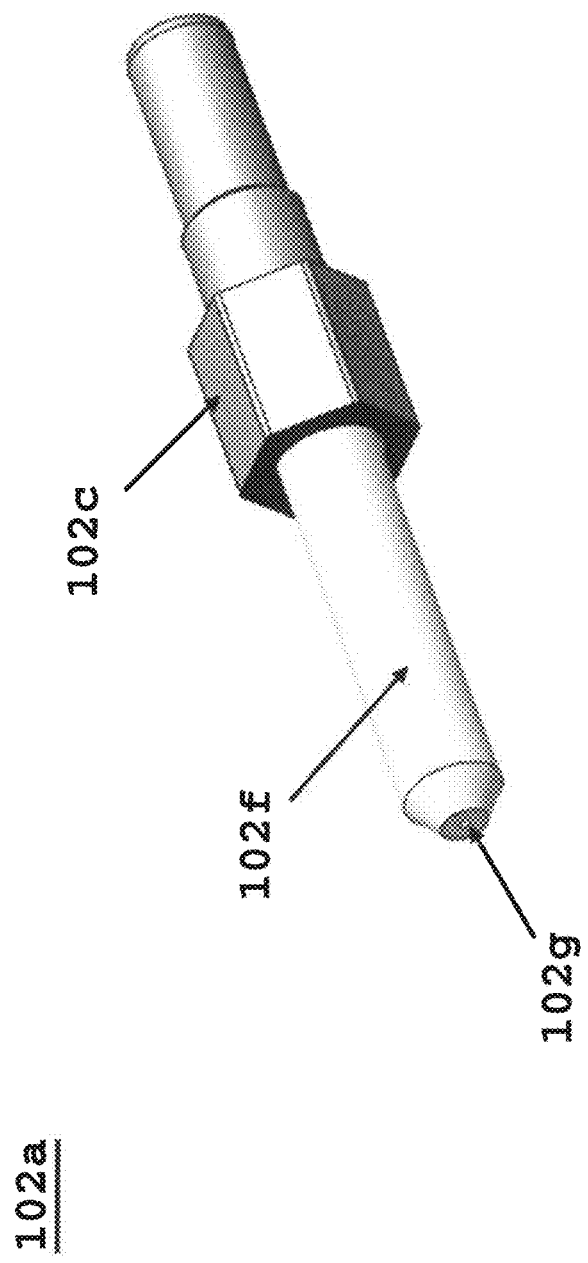
FIG. 1B is a perspective view of a ferrule assembly for a LC or CS connector.

FIG. 1B depicts ferrule assembly 102a. Ferrule assembly 102a has a fiber strand 102g surrounded by a ceramic carrier 102f, and a collar 102c. Collar 102c is accepted within a cavity or alignment sleeve of a front body 101.

FIG. 2A depicts a CS connector front body 201, according to the present invention. FIG. 2B depicts front body cavity or channel which is known in the art as an alignment sleeve 204. The cavity 204a accepts a proximal end of a ferrule assembly (102a, 102b). FIG. 2A housing 201 has an inner surface 204 with a plural of surfaces that correspond to outer surface or collar 102c of ferrule assembly 102a. As ferrule 102a is inserted under the force of its corresponding bias spring 103a, ferrule assembly may become misaligned or stuck within surfaces 204a (refer to FIG. 2B). FIG. 2C depicts being "stuck" or "jammed" as ferrule assembly 102a is not fully inserted into cavity 204a, which means its corresponding fiber strand is short, in terms of distance, "D", from an opposing fiber strand or transceiver receiver, and signal loss occurs that is greater than industry standard.

FIG. 3A depicts a CS connector front body 301 with ferrule assembly 102a jammed within front body cavity 301d (refer to FIG. 3B). FIG. 3B depicts a zoomed view of ferrule assembly 102a misaligned within housing cavity or alignment sleeve. FIG. 3C depicts a cross-section along line B-B' of ferrule assembly 102a misaligned in cavity of front body 201, as shown in FIG. 3D. FIG. 3C depicts outer surface of ferrule assembly 102c, or collar 102c misaligned within alignment sleeve 102d. "D" shows ferrule 102f does not extend beyond opening of outer housing 301, which means ferrule assembly 102a is jammed within housing cavity.

Figure 1C:
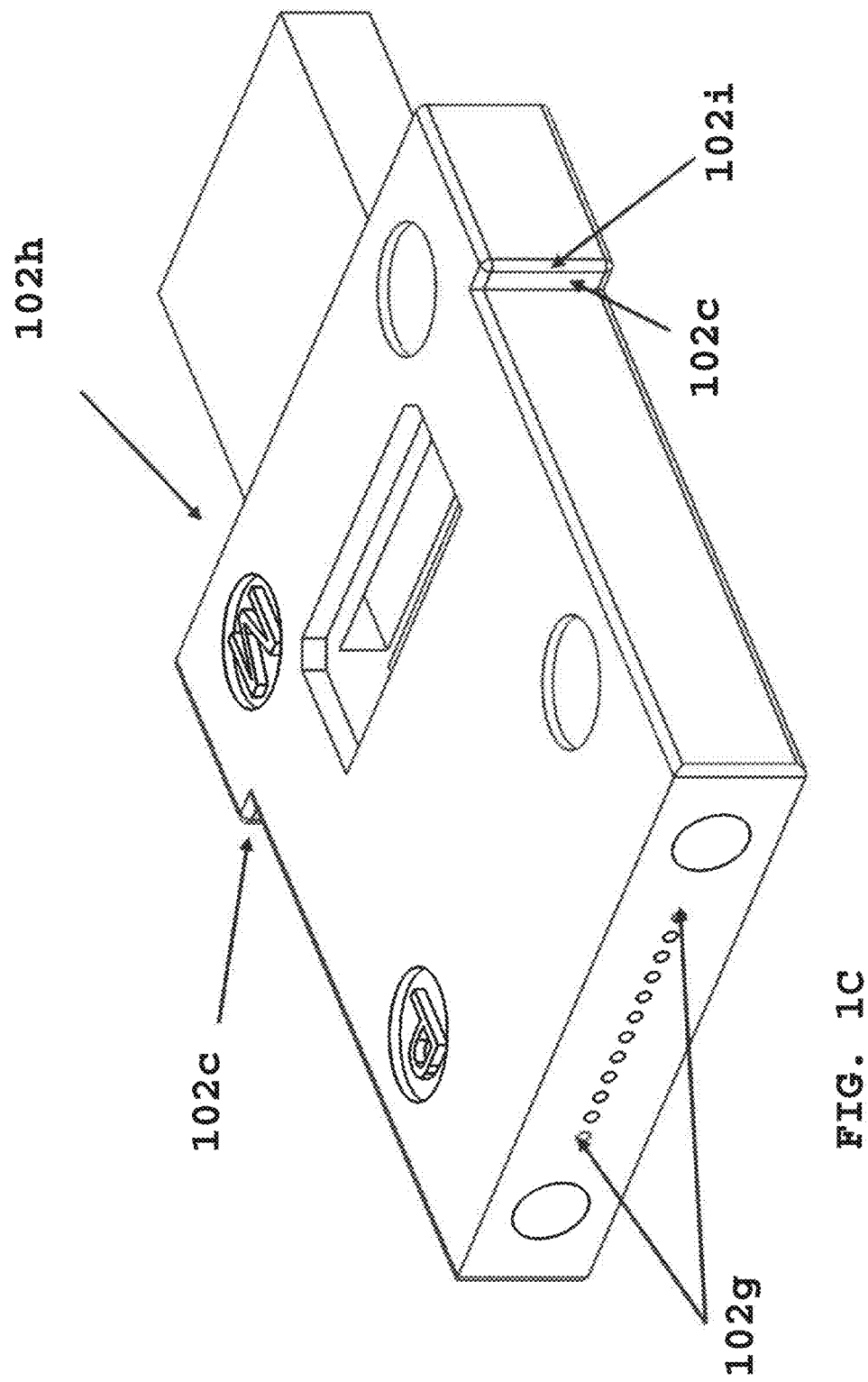
FIG. 1C is a perspective view of a MPO ferrule assembly.

FIG. 4A depicts front body 401 with cut-away 410. Cut-away 410 illustrates a plural of lead-ins 416. As shown in FIG. 4B, lead-ins 416 form anti-jam feature of the present invention. As depicted in FIG. 4B, lead-ins are molded as part of the alignment sleeve 102d, further reducing cost and ensuring inter-operability. The latter is important because ferrule assembly design is a long-time industry standard that cannot be changed. This invention substantially reduces ferrule assembly jamming and its associated production loss and failures in the field or outside plant. Lead-ins 416 can be triangular in shape with a varying draft angle 416a and varying opening 416b. The angle 416a or opening 416b is varied to accommodate collar surface of ferrule assembly 102a. FIG. 1C depicts a MPO or multi-fiber 102g push on ferrule assembly 102h with a cut-out collar 102c. Collar 102d has a radius that engages with lead-ins 416 upon insertion into a connector body (not shown).

FIG. 5A depicts CS® front body 501 with a cut-away view of cavity properly holding ferrule assembly 502a. Note ferrule 102f is distance "D" out of housing 501. FIG. 5B depicts insertion of assembly 502a toward a first end in direction of arrow "A". As assembly 502a is inserted, a contact point 512 rotates in direction R, (opposite direction rotation may occur depending on draft angle of lead-in as depicted in FIG. 8B for left-hand rotation). FIG. 5C depicts a front view of ferrule assembly rotation, R, as contact point 512 begins to engage lead-in 516 at lead-in draft angle 516a, as shown in FIG. 5D. FIG. 5E depicts further rotation, R, and further illustrates that ferrule assembly 502a is becoming aligned. Here as draft angle 516a makes contact with collar 502c, and draft angle 516a guides ferrule assembly into proper orientation, as shown in FIG. 5F. FIG. 5E depicts contact point 512 (and collar 502c as shown in FIG. 5F), has not jammed or is becoming properly oriented as ferrule assembly is inserted in arrow direction "I". FIG. 5F depicts ferrule assembly collar 502c properly oriented within lead-in 516a openings 516b.

FIG. 6A depicts prior art LC connector 620 using anti-jam, anti-stuck feature of the present invention. Ferrule assembly 602a is inserted in a jammed condition within plug frame 601. Plug frame 601 has a cavity that accepts ferrule assembly 602a. FIG. 6B is a zoomed view 602j, of ferrule assembly 602a jammed within cavity of plug frame. In FIG. 6B, contact point 612 is stuck at a portion of cavity wall. FIG. 6C depicts a view along C-C' (refer to FIG. 6C) and shows ferrule assembly 602a has not been fully inserted, illustrated by gap 601g. FIG. 6D depicts, front view of LC connector 620 where ferrule collar 602c is off-set or jammed within cavity or alignment sleeve holder 602d, of LC plug frame 601.

FIG. 7A depicts a prior art LC (UPC plug frame) connector 720 with ferrule assembly 702a being inserted within plug frame 701 in direction of arrow "A" containing the present invention (refer to FIG. 7B). FIG. 7B depicts triangular protrusion 716a and contact point 712 as ferrule assembly 702a is inserted into cavity of housing 701. FIG. 7C depicts further insertion and rotation "R" of ferrule assembly 702a. FIG. 7D depicts view along line D'-D' of FIG. 7C, as ferrule assembly collar 702c rotates along surface of anti-stuck feature, as depicted in zoomed view thereof in FIG. 7E. Contact point 712 enters opening 716b, which helps ensure that contact point 712 does not become jammed against a surface within alignment sleeve or cavity of connector body. FIG. 7F depicts a cut-away of a properly inserted ferrule assembly 702a as shown by ferrule 102f extending a pre-determined distance "D" out of connector housing 701. FIG. 7G depicts an end view of ferrule assembly 702 properly inserted into connector housing 701, as can be seen there is not misalignment between ferrule collar 702c and alignment sleeve or inner cavity of housing 701.

FIG. 8A depicts a square flange APC plug frame or SC connector 800. Ferrule assembly 802a has a square collar 802k or flange as compared with collar 102c, for a LC connector which is circular. Alignment sleeve 801a or inner cavity structure is stepped instead of triangular as in a LC connector housing 701. Ferrule assembly 802*a* is inserted in direction of arrow "A" from a distal or cable end of connector 820. FIG. 8B depicts contact point 812 rotating as back body compresses bias spring 803*a*. For SC connector 820 back body 804 and housing 801 are an integrated one-piece design. FIG. 8B depicts contact point 812 of flange/collar 892*k* as it rotates, "R" along angled surface before coming to rest aligned within opening 816*b* of the present invention, which avoids jamming of ferrule assembly 802*a* within cavity of housing 801. FIG. 8C depicts contact point 812 approaching opening 816*b* as ferrule assembly 802*a* rotates "R". FIG. 8D illustrates ferrule assembly 802*a* off-set or approaching alignment, that is its collar 802*k*, rotates "R" under force of bias spring 803, and aligns with openings 816*b*. FIG. 8E depicts end view of FIG. 8D along line A-A', as ferrule assembly 802*a* is approximately 50% inserted into housing 801. FIG. 8F depicts end view of FIG. 8G, of fully inserted ferrule assembly 802*a* that is not jammed, as further illustrated by ferrule extending distance "D" from housing 801 at proximal end of connector 820.

What is claimed is:

1. An optical fiber connector comprising:
a connector housing comprising a front body and a back body, each of the front body and the back body having a respective front end portion and a respective rear end portion spaced apart along a longitudinal axis, the front end portion of the back body configured to be secured to the rear end portion of the front body to form the connector housing, the front body comprising a first ferrule collar cavity and a second ferrule collar cavity spaced apart from the first ferrule collar cavity, each of the first and second ferrule collar cavities extending along the longitudinal axis from a respective front end to a respective rear end and having a respective inner side wall extending substantially parallel to the longitudinal axis between the respective front end and the respective rear end, the front body further comprising a first lip adjacent the front end of the first ferrule collar cavity and a second lip adjacent the front end of the second ferrule collar cavity, the first lip defining a first opening through the front end portion of the front body and the second lip defining a second opening through the front end portion of the front body spaced apart from the first opening, the front body further comprising a first lead-in surface adjacent the rear end of the first ferrule collar cavity and a second lead-in surface adjacent the rear end of the second ferrule collar cavity, each of the first and second lead-in surfaces being oriented transverse to the longitudinal axis;
a first ferrule assembly comprising a first cylindrical ferrule, a first ferrule collar, and a first ferrule spring, the first ferrule collar comprising a front end, a rear end, and an outer side wall extending along the longitudinal axis from the front end to the rear end, the side wall corresponding in shape with the inner side wall of the first ferrule collar cavity, the first ferrule assembly being configured to be inserted into the front body in a back-to-front direction such that the front end of the first ferrule collar is directed by the first lead-in surface into the first ferrule cavity and moves along the first ferrule cavity until seated against the first lip, the first cylindrical ferrule protruding through the first opening when the front end of the first ferrule collar is seated against the first lip and the outer side wall of the first ferrule collar opposing the inner side wall of the first ferrule collar cavity such that the first ferrule collar is inhibited from rotating in the first ferrule collar cavity; and
a second ferrule assembly comprising a second cylindrical ferrule, a second ferrule collar, and a second ferrule spring, the second ferrule collar comprising a front end, a rear end, and an outer side wall extending along the longitudinal axis from the front end to the rear end, the side wall corresponding in shape with the inner side wall of the second ferrule collar cavity, the second ferrule assembly being configured to be inserted into the front body in a back-to-front direction such that the front end of the second ferrule collar is directed by the second lead-in surface into the second ferrule cavity and moves along the second ferrule cavity until seated against the second lip, the second cylindrical ferrule protruding through the second opening when the front end of the second ferrule collar is seated against the second lip and the outer side wall of the second ferrule collar opposing the inner side wall of the second ferrule collar cavity such that the second ferrule collar is inhibited from rotating in the second ferrule collar cavity;
wherein when the back body is secured to the front body, the back body is configured to compress the first and second ferrule springs against the first and second ferrule flanges to yieldably bias the first and second ferrule assemblies forward in the first and second ferrule cavities and the connector housing is configured to be plugged into a receptacle to make an optical connection to the first and second cylindrical ferrules.

2. The connector housing of claim 1, wherein each of the first lead-in surface and the second lead-in surface slopes relative to the longitudinal axis at a non-perpendicular angle.

3. The connector housing of claim 1, where said connector housing is part of a CS connector.

4. The connector housing of claim 1, wherein each of the first and second ferrule collars is one of square and hexagonal.

5. The connector housing of claim 3, wherein said ferrule assembly is used with, a CS connector.

6. A method of assembling said optical fiber connector of claim 1, the method comprising:
inserting the first ferrule assembly into the front body so that the first ferrule collar is received in said first ferrule collar cavity;
inserting the second ferrule assembly into the front body so that the second ferrule collar is received in said second ferrule collar cavity.

7. The optical fiber connector of claim 1, wherein each of the first and second lead-in surfaces has a rear end and a front end spaced apart along the longitudinal axis, the front end of each of the first and second lead-in surfaces adjoining the rear end of one of the first and second ferrule collar cavities.

8. The optical fiber connector of claim 7, wherein each of the first and second ferrule collar cavities has a respective cavity longitudinal axis parallel to the longitudinal axis of the connector housing.

9. The optical fiber connector of claim 8, wherein the inner side wall of each of the first and second ferrule cavities comprises a plurality of planar sides spaced apart about the respective cavity longitudinal axis, each planar side having a front end and a rear end spaced apart along the respective cavity longitudinal axis.

10. The optical fiber connector as set forth in claim 9, wherein the first lead-in surface adjoins the rear end of each of the plurality of planar sides of the inner side wall of the first ferrule cavity at a respective angled edge.

11. The optical fiber connector as set forth in claim 10, wherein each angled edge has a rear end and a front end spaced apart along the cavity longitudinal axis of the first ferrule cavity.

12. The optical fiber connector as set forth in claim 11, wherein each angled edge extends in a circumferential direction about the cavity longitudinal axis of the first ferrule cavity as the angled edge extends longitudinally from the respective rear end to the respective front end.

13. The optical fiber connector as set forth in claim 9, wherein each of the first and second lead-in surfaces comprises a conical surface that slopes inwardly toward the respective cavity longitudinal axis as the respective one of the first and second lead-in surfaces extends longitudinally from the respective rear end to the respective front end.

* * * * *